United States Patent [19]

Thoraval

[11] Patent Number: 4,511,843
[45] Date of Patent: Apr. 16, 1985

[54] ELECTROMAGNETIC LOGGING SONDE HAVING IMPROVED HOUSING

[75] Inventor: Yvon Thoraval, Le Plessis-Robinson, France

[73] Assignee: Schlumberger Technology Corporation, New York, N.Y.

[21] Appl. No.: 311,801

[22] Filed: Oct. 15, 1981

[30] Foreign Application Priority Data

Oct. 17, 1980 [FR] France ............... 80 22327

[51] Int. Cl.³ .............................................. G01V 3/30
[52] U.S. Cl. ................................................... 324/338
[58] Field of Search ................. 324/323, 338–343, 324/329; 455/90

[56] References Cited

U.S. PATENT DOCUMENTS

| | | | |
|---|---|---|---|
| 2,723,375 | 11/1955 | Schuster | 324/6 |
| 2,857,451 | 10/1958 | Barclay | |
| 3,052,837 | 9/1962 | Arbogast et al. | 324/329 |
| 3,094,658 | 6/1963 | Bravenec | 324/339 |
| 3,124,742 | 3/1964 | Schneider | 324/339 X |
| 3,214,686 | 10/1965 | Elliot et al. | 324/339 |
| 3,305,771 | 2/1967 | Arps | 324/342 |
| 3,408,561 | 10/1968 | Redwine et al. | 324/342 |
| 3,551,797 | 12/1970 | Gouilloud et al. | 324/338 |
| 3,582,766 | 6/1971 | Iizuka | 324/338 |
| 3,894,283 | 7/1975 | Schonstedt | 324/329 X |
| 4,012,689 | 3/1977 | Cox et al. | 324/6 |
| 4,107,597 | 8/1978 | Meador et al. | 324/6 |
| 4,107,598 | 8/1978 | Meador et al. | 324/6 |
| 4,319,191 | 3/1982 | Meador et al. | 324/338 X |
| 4,401,947 | 8/1983 | Cox | 324/338 |

FOREIGN PATENT DOCUMENTS

| | | | |
|---|---|---|---|
| 777913 | 2/1968 | Canada | 324/6 |
| 280698 | 1/1971 | U.S.S.R. | 324/339 |

Primary Examiner—Gerard R. Strecker
Attorney, Agent, or Firm—David H. Carroll

[57] ABSTRACT

Apparatus for communicating electromagnetic energy between a logging tool and a surrounding medium comprise a support member, a radiating/receiving element disposed on one surface of a nonconductive dielectric material having a shape compatible with the shape and dimensions of the support member, a ground plane disposed on the other face of the dielectric opposite the radiating/receiving element and a predetermined distance therefrom, and impedance means, a short circuit in one embodiment, electrically connecting an end of the first element to the second element. The dielectric, radiating/receiving element, and ground plane are carried by the support member, which may be a mandrel or a pad. Various embodiments particularly suitable for use in certain applications and with certain kinds of logging tools are described. Furthermore, related methods for communicating electromagnetic energy between a logging tool and a surrounding medium and related logging tools for investigating the electrical permittivity and/or electrical conductivity of a formation traversed by a borehole are described.

11 Claims, 18 Drawing Figures

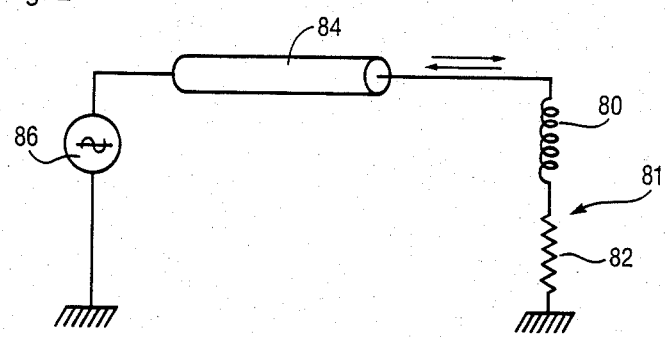
Fig. 2
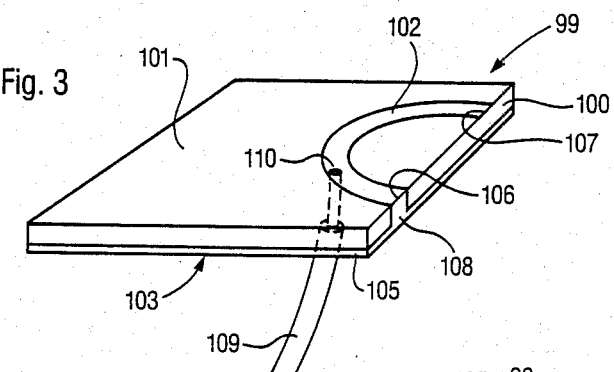
Fig. 3
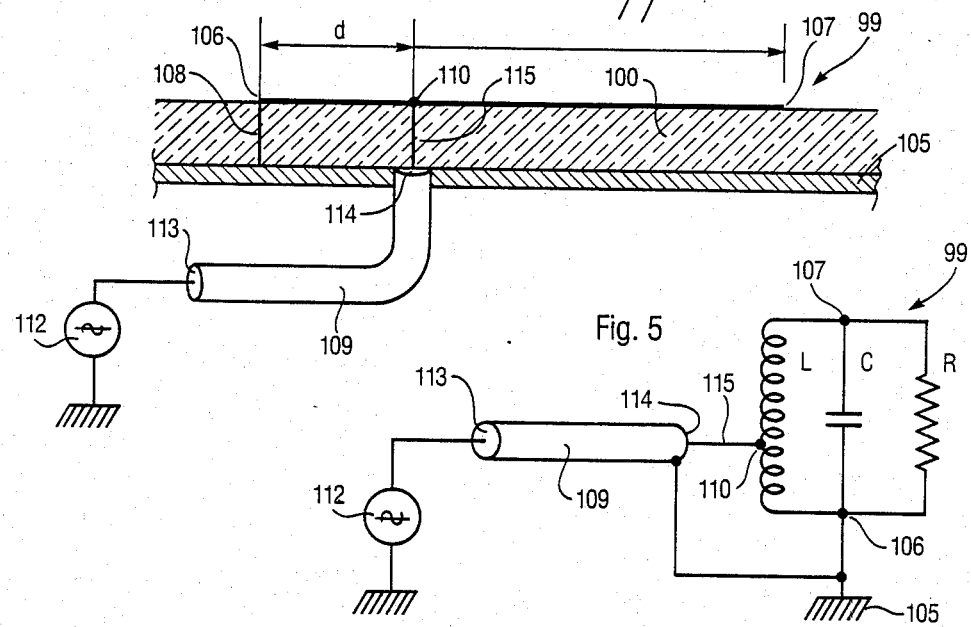
Fig. 4
Fig. 5

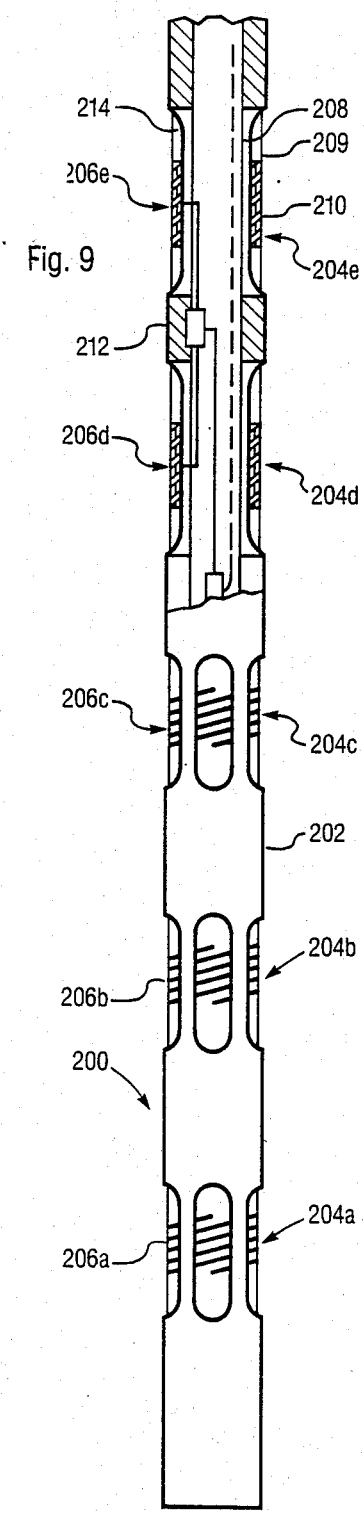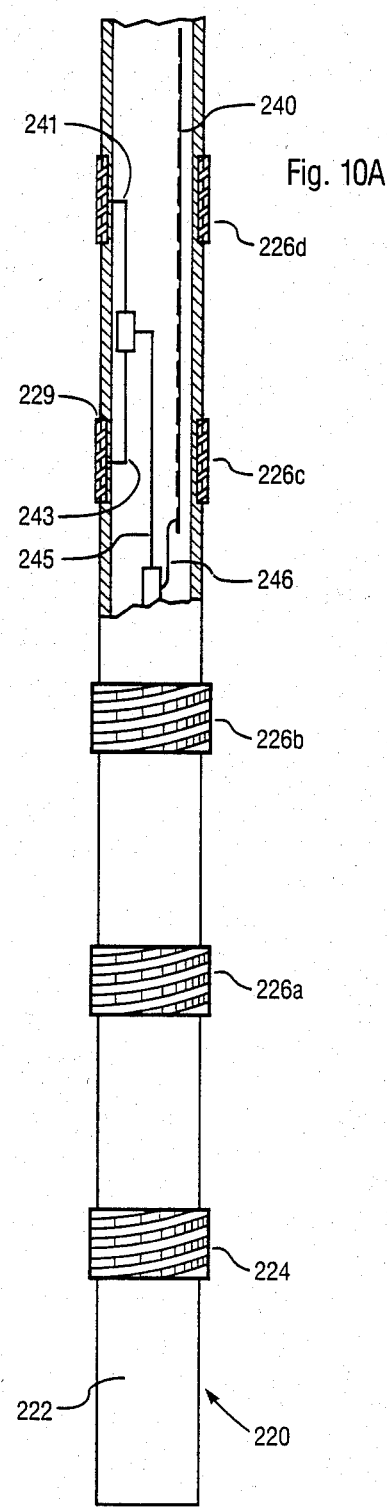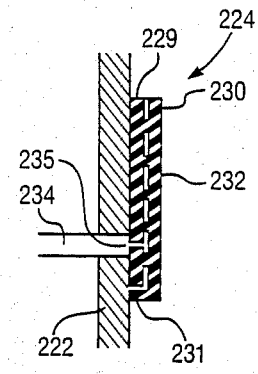

ELECTROMAGNETIC LOGGING SONDE HAVING IMPROVED HOUSING

BACKGROUND OF THE INVENTION

This invention relates to the investigation of underground medium with electromagnetic energy, and more particularly to improved radiating and receiving structures for communicating electromagnetic energy between a logging tool and a surrounding earth formation for determining the electrical permittivity and/or the electrical conductivity of the formation, and to improved logging tools based thereon.

Techniques are known for investigating underground formations traversed by a borehole by moving a sonde through the borehole and making measurements versus depth of certain physical properties of the surrounding formations to obtain logs from which it is possible to derive information useful for the exploration and/or extraction of mineral materials or fluids from the formations around the borehole.

Such measurements make use of various techniques, including electromagnetic waves, in order to determine certain parameters in accordance with the behavior of the electromagnetic waves in the formations. For instance, electrical conductivity measurements can be obtained in formations traversed by a borehole by electromagnetic induction as described, for example, in the U.S. Pat. No. 2,582,314 (issued Jan. 15, 1952 to Doll). The principle of electromagnetic induction, generally, is that a transmitting coil mounted on a sonde is energized by an oscillator operating at a suitable frequency, for example of the order of 20 kHz, to induce currents in the surrounding geological formations. The value of these currents, which flow along substantially circular lines centered on the centerline of the borehole, depends on the conductivity of the formations in which they originate. These currents produce an electromotive force in typically several receiving coils mounted on the logging sonde at given distances from the transmitting coil. An analysis of the parameters of the output signal of these receiving coils in relation to the signal transmitted makes it possible to obtain information on the conductivity of the formations traversed by these currents.

Induction conductivity measurement (induction logging) is a basic technique in the investigation of geological formations traversed by a borehole. It compliments electrical resistivity measurement methods, which are based on electrode-type tools. Induction conductivity measurement is indispensable when the medium inside the borehole (which in exploratory boring is generally filled with mud intended to stabilize the wall of the borehole) is not a good conductor of electricity and does not allow the use of electrode tools. More recently, tools for measuring certain properties of the formations around a borehole have been proposed which involve the propagation of electromagnetic energy in the formations at substantially higher frequencies than the frequencies used in induction logging. In these techniques, radio frequencies are used in a range which can extend from as low as about 1 MHz to about 1.1 GHz and beyond.

It is known that the parameters characteristic of the propagation of an electromagnetic wave in a medium such as geological formations depend both on the conductivity and dielectric constant of these formations. The attenuation of an electromagnetic wave propagating over a distance D in a medium which tends to dissipate the electromagnetic energy varies according to the expression:

$$e^{-jkD} \quad (1)$$

in which e is the symbol of the exponential; j is the imaginary operator; D is the distance traveled by the energy; and k is a complex propagation constant defined by the formula:

$$k^2 = -j\omega\mu_o(\sigma + j\omega\epsilon) \quad (2)$$

In this equation, $\omega$ is the angular (radian) frequency, considered ($\omega = 2\pi f$); $\mu_o$ is the magnetic permeability of the medium; $\sigma$ is the conductivity of the medium; and $\epsilon$ is the dielectric constant or electrical permittivity of the medium.

If one considers a nonconducting medium in which $\sigma$ equals zero, from the expression (2) we see that the constant k is a real term. The exponent of the exponential of expression (1) is then a pure imaginary term which corresponds only to a phase shift in the expression of the attenuation of the transmitted signals. In other words, the propagation of the waves in this medium takes place with geometrical amplitude attenuation and without overall energy attenuation. As the conductivity of the medium increases (conducting drilling mud, for example), the term $\sigma$ becomes much higher than the term $j\omega\epsilon$. According to expression (2), the term $k^2$ tends to become purely imaginary. The exponent of the exponential of expression (1) then becomes a term having an imaginary component and a real component substantially equal to each other. As the propagation constant k continues to increase with conductivity, the real component of the attenuation increases exponentially with k. Thus, as a first approximation the phase shift increases with the electrical permittivity while the amplitude attenuation increases with conductivity.

In order to measure these characteristic parameters, generally at least two receivers are spaced longitudinally with respect to each other and a transmitter. The distance from the transmitter to the nearest of these receivers longitudinally in the direction of the borehole determines the depth of the formation that can be reached for the measurement. The distance between the receivers determines the thickness of the formation over which the measurements of the propagation characteristics of the transmitted wave are obtained. These characteristics are, notably, the relative attenuation of the signals picked up by the near receiver and the far receiver, and the phase shift between the signals received by the near receiver and the far receiver.

The influence of the conductivity of the formation on the attenuation and phase shift becomes predominant as the investigation frequency drops. As the frequency increases into the microwave region, the influence of the electrical permittivity of the formation becomes predominant.

To obtain measurements of one or the other of these characteristic parameters (the electrical conductivity and the electrical permittivity), two simultaneous or consecutive measurements must be made of the propagation of electromagnetic waves for each formation zone of interest, for example one relative attenuation measurement and one relative phase measurement. U.S. Pat. No. 4,052,662 (issued Oct. 4, 1977 to Rau) discloses a tool operating within the microwave frequency range for determining the propagation characteristics of electromagnetic waves in a medium near the wall of the borehole. This tool includes a sonde equipped with pads designed to be applied against the wall of the borehole. On this pad are mounted a transmitting antenna and several receiving antennas of the cavity backed slot type. At an operating frequency of 1.1 GHz, the attenuation and the phase shift of waves picked up by the receiving antennas are measured to obtain the value of the dielectric constant of a zone of small thickness around the borehole immediately beyond the mudcake. At such high frequencies, the value of the dielectric constant of the investigated medium has a decisive influence on the attenuation and phase shift measurements. The influence of the conductivity of the investigated medium on these measurements becomes increasingly smaller as the frequency rises. The combination of attenuation and phase shift measurements makes it possible to completely eliminate the influence of the conductivity to determine the electrical permittivity of the investigated medium.

To obtain greater depth of investigation, it is necessary to space the transmitter and the receivers at distances which render pad mounting difficult to implement. It is then preferable to install the receivers and the transmitter directly on the mandrel of the logging sonde. Since the distance to be traveled by the electromagnetic waves increases with the investigation depth and the attenuation of an electromagnetic wave in a medium in which it propagates is an increasing function of frequency, one is then led to use lower operating frequencies, for example 20 to 30 MHz.

Electromagnetic logging tools are thus known which are equipped with a transmitter and receivers mounted on a mandrel at distances which can be of the order of a meter or more to obtain measurements covering zones located at a radial distance greater than a meter with respect to the borehole centerline. Such a tool is described in U.S. Pat. No. 4,185,238 (issued Jan. 22, 1980 to Huchital and Tabanou). A transmitter at the bottom of the mandrel operates at a given frequency. The midpoint of a first pair of longitudinally spaced receivers is at a first distance from the transmitter to obtain a relative attenuation measurement of the signals coming from the transmitter through the surrounding medium. The midpoint of a second pair of longitudinally spaced receivers is at a second distance from the transmitter, greater than the first distance, to obtain a measurement of phase shift or relative phase between the signals reaching them. The first and second distances are selected so that the attenuation and phase shift measurements performed by the first and second pairs of receivers respectively pertain to the same depth of investigation in the formation. It was determined that the measurements of the attenuation and relative phase of waves propagating through formations were affected in a different manner by the distance between the zone of interest and the borehole centerline. Thus, to obtain measurements of the phase shift caused by the propagation of waves in a formation zone at a given distance from the borehole, it was necessary to use a pair of receivers located at a greater distance from the transmitter than the distance between the pair of receivers used for wave attenuation measurements in this same zone.

In general, the radiation transducers (transmitters or receivers) used for electromagnetic logging, whether pad or mandrel mounted, must meet certain conditions. In particular, they must be adapted to the transmission of energy in highly dissipative media, i.e. where it is accompanied by considerable losses. During transmission these transducers must thus be capable of transmitting large amounts of energy to the surrounding medium, while during reception they must be capable of picking up signals of extremely low level. Moreover, these transducers must have particular directivity characteristics. In general, in electromagnetic logging techniques, one seeks to favor the propagation of waves in the direction of the formations rather than the propagation of these waves longitudinally in the borehole. It is thus important to ensure that the transducers used for this purpose have well determined directivity characteristics.

In one known technique, disclosed in United Kingdom Pat. No. 1,088,824 (Shell Internationale Research Maatschappij N.V.), two electrodes together with the rock formation and borehole fluid form a capacitor. In the frequency range 150 MHz through 1500 MHz, the electrodes preferably constitute a dipole aerial. According to another prior art technique (see, for example, the Inventors Certificate of the USSR in the name of Daev, No. 177,558), the transmitters and receivers used for the transmission of electromagnetic waves between the tool and the surrounding medium are toroidal coils whose centerline is directed along the centerline of the drilling tool mandrel. Other types of coils for the transmission and reception of electromagnetic waves are disclosed in U.S. Pat. No. 3,891,916 (issued June 24, 1975 to Meador et al.) and the aforementioned Huchital and Tabanou Patent. These coils operate as dipoles, which have good directivity.

The use of coils makes it possible to remedy to a certain extent the disadvantages associated with antennas forming capacitor plates, such as disclosed in the aforementioned UK Pat. No. 1,088,824, which would be shorted by a conductive borehole fluid. In particular, coils are capable of operating in slightly conductive drilling fluids. This improvement has limits, however, and the level of the signals which reach the receivers after propagation through the formations being investigated often is extremely low. Considerable precautions are necessary to avoid the deterioration of the signals picked up by the receivers for subsequent processing. It is also necessary to provide extremely sensitive electronic measurement circuits which make the construction of the tool more difficult and its operation more complex. This is particularly the case for the circuits associated with coils relatively far from the transmitter, such as for example the phase shift measuring circuits disclosed in the aforementioned Huchital and Tabanou Patent.

Moreover, the efficiency of traditional coils is extremely low due a number of factors. A traditional coil can be thought of as comprising, equivalently, an inductance coil connected in series with a resistor. This coil is supplied with electromagnetic energy by an oscillator 86 through a coaxial cable. The traditional coil is very highly reactive due to the high value of the equivalent inductance coil. Since the coaxial cable supplying this coil is designed to give it an essentially active energy to be radiated, an impedance matching defect occurs which is in itself the cause of poor energy transmission efficiency at very high frequency. The impedance matching defect results in the establishment of a system of standing waves between the oscillator and the coil, and the maintenance of these standing waves consumes a very large fraction of the energy which transits through the coaxial cable. Under these conditions, the efficiency of the transmission of energy between the oscillator and the coil hardly exceeds 10%. Tuning circuits are necessary to place the coil in a resonant condition, but these tuning circuits are difficult to manufacture, are subject to radiation leakage, and require a significant amount of space in the logging tool. Furthermore, considerable ohmic losses occur due to the windings of the traditional coil. Dielectric losses also result from the capacitive link between the conductors of the coil proper and other parts of the logging tool that are grounded. In all, the power radiating by a coil type radiating system is hardly more than about 1% of the power available at the output of the supply oscillator. The same phenomenon holds for a receiving coil.

Another disadvantage of known coils arises from the fact that the attenuation of an electromagnetic wave propagating in a medium increases greatly with the electrical conductivity of this medium. Thus, with known tools, when the resistivity of the drilling mud is lower than 0.1 ohm per meter, the attenuation of the electromagnetic waves in the drilling mud does not allow utilizable information to be obtained from the propagation of electromagnetic waves through the formations being investigated. By increasing the diameter of the coils, however, the power radiated by the coils could be increased and the drilling fluid thickness traversed by the electromagnetic energy (and hence the attenuation) could be reduced. However, the outer diameter of the tool is limited by the size of the boreholes in which the tool is to be used and by considerations relative to overall dimensions.

Such known coils have other disadvantages as well. They are difficult to manufacture, assemble, and mount on the logging tool, which increases costs. In particular, variation in the spacing of the coils along the mandrel due to thermal expansion in the borehole is difficult to minimize or take into account.

The poor efficiency of known coils has other implications as well. Electromagnetic propagation tools also include electronics for processing the signals picked up by the receiving antennas which, owing in particular to the low level of these signals, must be located near these antennas. The electronics is normally housed either in the upper part of the sonde body or in a case specially attached to this sonde body, to which the wireline cable is coupled. The transmitter must thus be located under the receiver toward the bottom part of the tool 30, and its power oscillator must be placed nearby in order to limit the length of the connecting coaxial line. This oscillator is powered via electrical conductors coming from the surface through the wireline cable conductors which pass through the sonde body and hence pass near the receiving antennas. In view of the low level of the signals received, it is necessary to isolate the receiver circuits from the disturbing influence of the currents carried by the power supply conductors of the oscillator 60.

A solution applied in certain cases is to supply the oscillator through a battery during the measurement periods when the transmitter sends radiation in the direction of the formations, this battery being rechargeable outside of the operating periods of the electromagnetic detection system. However, this solution calls for the use of a battery in the hostile environment in which logging tools are required to operate, resulting in particular to exposure to very high temperatures. The attendant disadvantage are fragility, an insufficient energy reserve for long-duration logging operations, and poor reliability. An alternate solution is to surround the conductors which supply the oscillator from the suspension cable of the tool with a screen made up of a longitudinal metal tube that traverses the sonde up to the oscillator. In the case of coil-type tools where the transmitted or received power depends on the flux traversing the coils, the use of the tube is at the expense of the surface area available for the flux.

Limitations in detection and processing electronics, in combination with known coil antennas, has other implications as well. Improvement in the resolution of the investigation while maintaining a desired investigation depth is sometimes desirable; however, known electromagnetic logging tools are limited in resolution for a given depth of investigation. Depth of investigation depends on the distance between the transmitting antenna and a receiver antenna pair, while resolution depends on the distance between the receiving antennas of the pair. As taught in the aforementioned Huchital and Tabanou Patent, each receiving antenna pair performs a differential measurement of the variation in certain propagation parameters such as the attenuation or the phase shift produced by a formation zone whose thickness is defined by the spacing of these receivers. Although decreasing receiving antenna spacing in principle improves resolution of the measurement, the spacing of the receiving antennas of the pair must be of sufficiently magnitude to permit the detection and measurement of the values of the parameters of the received waves by the detection and processing electronics. Thus, for example, if one wishes to detect the differences in phase shift to within a fraction of a degree, the spacing of the two corresponding receivers must be sufficient so that the variations in this parameter between two formations of a different nature to be distinguished exhibit at least this value over the considered formation thickness. The same concern applies to attenuation measurement. This limitation in resolution for a given depth of investigation is a disadvantage of known electromagnetic logging tools.

It is also known that induction measurements are particularly suitable for certain borehole domains and that resistivity measurements are particularly suitable for certain other borehole domains. Systems combining induction and resistivity measurement systems are known, but a disadvantage of combining the two measurement systems arises from the sensitivity of the antenna coils to the distorting effect of the conductive electrodes in proximity therewith. One approach to overcoming this disadvantage is addressed in U.S. Pat. No. 3,124,742 (issued Mar. 10, 1964 to Schneider), which discloses an electrode system having a number of individual electrodes, each comprising a closed loop formed by a conductor of relatively small cross-sectional area and a series of plates that form a discontinuous electrode encircling the longitudinal axis. Such a system disadvantageously precludes the use of relatively massive electrodes having better investigation depth performance.

It is also known that relatively shallow resistivity measurements are available with the use of pad-type logging tools; see, for example, U.S. Pat. No. 2,712,630 (issued July 5, 1955 to Doll). Furthermore, it is known to use relatively shallow resistivity measurements to determine the dip angle and the azimuthal angle of formation bedding planes by passing through a borehole a "dipmeter" tool having a plurality of circumferentially-spaced pad-mounted electrodes. Although these conventional multiple-pad dipmeter devices provide generally satisfactory results, an inherent difficulty is the necessity to insure that the pads make reasonably good contact with the surrounding formations when the borehole fluid is relatively nonconductive (e.g., oil based drilling mud). Another type of dipmeter device, the so-called "induction dipmeter," has been proposed to overcome this disadvantage. The induction dipmeter, which is based on the principles of induction logging to measure dip angle, includes conventional induction coils wound on an insulating mandrel or on pads urged against the borehole wall. The disadvantages associated with coils affect such induction dipmeter devices as well.

In the field of atmospheric and space telecommunications, a known technique is to use antennas comprising a dielectric plate, one side of which has printed thereon an elongated conducting element while the other side is metalized to form a second conducting element or ground plane. These antennas, known as bi-plate lines, used printed circuit manufacturing techniques. The efficiency of these antennas, however, is not as good as can be achieved with conventional above-ground antennas, which are dimensioned according to the propagation wave-length of the radiation they are designed to transmit in air or vacuum. Nonetheless, they have been found to be well suited to omnidirectional type transmission in air or vacuum in atmospheric and space telecommunications applications because these applications use frequencies of several hundred megahertz where the efficiency of antennas of this type, which increases as the square of their utilization frequency, is acceptable. Furthermore, because the propagation of electromagnetic waves in these media takes place practically without loss, the relatively lesser efficiency of bi-plate antennas in these applications is compensated by their advantages. These advantages include in particular the relative easy with which the bi-plate antenna can be shaped in a relatively small volume to the form of atmospheric or space vehicles.

SUMMARY OF THE INVENTION

An object of the present invention is to expand the field of application of electromagnetic logging tools.

Another object of the present invention is to propagate into earth formations electromagnetic radiation that is of significantly greater magnitude than is available with known electromagnetic logging tools.

Another object of the present invention is to provide radiating and receiving elements for electromagnetic logging tools having greater efficiency than known radiating and receiving elements for electromagnetic logging.

Another object of the present invention is to provide radiating and receiving elements for electromagnetic logging tools having simplified impedance matching.

Another object of the present invention is to eliminate the need for special tuning circuits in electromagnetic logging tools.

Another object of the present invention is to provide for the transmission of high power electromagnetic radiation from electromagnetic logging tools subject to the constraints of the borehole environment.

Another object of the present invention is to provide for the reception of very low power electromagnetic radiation by electromagnetic logging tools subject to the constraints of the borehole environment.

Yet another object of the present invention is to provide for electromagnetic logging tools electromagnetic radiating and receiving elements suitable for the transmission and reception respectively of energy in highly dissipative media.

A further object of the present invention is to provide electromagnetic logging tools suitable for use in boreholes containing drilling mud of very low resistivity.

Yet another object of the present invention is to provide for electromagnetic logging tools electromagnetic radiating and receiving elements having particular desired directivity characteristics.

Yet another object of the present invention is to prevent the signal power being supplied to the electromagnetic radiating element of an electromagnetic logging tool from affecting the electromagnetic receiving element.

Yet another object of the present invention is to provide electromagnetic logging tools and electromagnetic radiating and receiving elements that minimize or eliminate propagation of the transverse electromagnetic mode.

Yet another object of the present invention is to provide electromagnetic logging tools having improved resolution at a given depth of investigation, relative to known electromagnetic logging tools.

Yet another object of the present invention is to provide for dipmeter devices and relatively shallow depth-of-investigation electromagnetic logging tools that are suitable for investigation of earth formations in relatively nonconductive borehole fluids.

Yet another object of the present invention is to provide electromagnetic logging tools that are suitable for operation at relatively lower frequencies than possible with known electromagnetic logging tools.

Yet another object of the present invention is to facilitate conforming electromagnetic radiating and receiving elements for deep depth of investigation to the dimensions of electromagnetic logging tools.

Yet another object of the present invention is to allow a greater reduction in the length of electromagnetic logging tools than is possible for known electromagnetic logging tools, and generally to allow greater flexibility in the design of electromagnetic logging tools.

Yet another object of the present invention is to provide radiating and receiving elements for electromagnetic logging tools that are more rugged and more simply manufactured, assembled, and mounted at lesser cost than known electromagnetic radiating and receiving elements.

Yet another object of the present invention is to allow the use of more simplified and reliable detection electronics than is possible in known electromagnetic logging tools.

Yet another object of the present invention is to provide radiating and receiving elements for combination electromagnetic-resistivity logging tools that are compatible with the use of relatively massive electrodes as well as restricted cross-sectional area electrodes.

The aforementioned and other objects are achieved by the present invention in accordance with an apparatus for communicating electromagnetic energy between a logging tool adapted for movement in a borehole traversing earth formations and a surrounding medium, the apparatus comprising a support member adapted for movement through the borehole; separation means having a shape compatible with the shape and dimensions of the support member and comprising a nonconductive material; a first conductive element disposed in a first region of the separation means, at least a portion of the first region facing the medium; a second conductive element disposed in a second region of the separation means opposite the first element and a predetermined distance therefrom; and impedance means electrically connecting an end of the first element to the second element. The separation means, first element, and second element are carried by the support member.

Various embodiments are particularly suitable for use in certain logging applications (other logging applications are of course possible) and with certain kinds of logging tools. For example, in one embodiment particulary suitable for low frequency applications, the impedance has a predetermined reactance, the length of the elongated strip of the first element being less than a quarter wavelength of the electromagnetic energy in the nonconductive material. Another embodiment particulary suitable for low frequency applications further comprises another impedance means connecting the other end of the first element to the second element, the first-mentioned impedance having essentially zero capacitance, reactance and resistance with the second-mentioned impedance having a predetermined capacitance, the length of the elongated strip of the first element being less than a quarter wavelength of the electromagnetic energy in the nonconductive material. In another such embodiment, the separation means comprises a dielectric material or a high magnetic permeability material. In one embodiment particularly suitable for mandrel-type tools, the separation means is cylindrical and of a uniform predetermined thickness, and the first element comprises a helical portion of uniform pitch. Other embodiments particularly suitable for mandrel-type tools are described. In one embodiment particularly suitable for minimizing propagation of the transverse electromagnetic mode, the helical portion of the first element is imbedded in the separation means and electrically insulated over the length thereof from the second element, and a helical portion of a third element with pitch equal to the pitch of the helical protion of the first element is imbedded in the separation means and electrically short-circuited over the length thereof to the second element and interspersed with the helical portion of the first element. In another such embodiment, the first element comprises two helical portions of equal length and respective pitches of equal magnitude and opposite direction. In one embodiment particularly suitable for eliminating the transverse electromagnetic mode problem, the support member is a conductive mandrel in electrical contact with the fluid in the borehole, and the supporting means is a cylinder mounted over a portion thereof with the second element in electrical contact therewith. Other such embodiments are described. In one embodiment particularly suitable for relative high frequency applications, the separation means is a buttom-like disk of predetermined uniform thickness and the first element is a flat spiral. In other such embodiments, the support member is a longitudinally elongated logging pad and the separation means is fixedly mounted on the face to be applied to the borehole wall, essentially conterminous therewith. The first element may be a flat spiral, a conductive ring, a conductive bar, or a flat spiral having straight line segments angularly joined for covering a substantial portion of the pad. In one embodiment particularly suitable for impedance matching, the first element has a preselected connection point, a central conductor of the connecting coaxial cable being connected to the connection point and the shield of the coaxial cable being connected to the second element. In one embodiment particularly suitable for protecting the first element, the separation means is mounted on a reduced-diameter portion of the mandrel and the mandrel includes a plurality of longitudinal parallel bars overlying the first element. Other such embodiments are described. In one embodiment particularly suitable for shielding the first element of a receiving antenna from the influence of signal power being supplied to the radiating antenna, the second element is conterminous over the second region of the supporting means. Other such embodiments are described. These and other embodiments having the aforementioned objects are described in detail in the following Detailed Description.

The aforementioned and other objects are achieved by the present invention in accordance with an apparatus for determining a characteristic of an earth formation traversed by a borehole, comprising a source of electromagnetic energy, means for determining the characteristic in accordance with a property of electromagnetic energy received at the receiver, means connected to the source for radiating electromagnetic to a surrounding medium at a first location in the borehole, and means connected to the determining means for receiving electromagnetic energy propagating through the surrounding medium positioned at a second location in the borehole. The radiating means and the receiving means comprise, respectively, a support member adapted for movement through the borehole; separation means having a shape compatible with the shape and dimensions of the support member and comprising a nonconductive material; a first conductive element disposed in a first region of the separation means, at least a portion of the first region facing the medium; a second conductive element disposed in a second region of the separation means opposite the first element and a predetermined distance therefrom; and impedance means electrically connecting an end of the first element to the second element. The separation means, first element, and second element are carried by the support member.

The aforementioned and other objects are achieved by the present invention in accordance with a method for communicating electromagnetic energy between a logging tool adapted for movement in a borehole traversing earth formations and a surrounding medium. In the methods, logging device having a receiver circuit or a source of electromagnetic energy is suspended in the borehole. A first conductive element is connected to the receiver circuit or the source. The first element is placed in a first region of a dielectric material, at least a portion of the first region being positioned toward said medium. A second conductive element is placed in a second region of the dielectric material, opposite and a predetermined distance from the first element. The first element is electrically connected to the second element by an impedance. The first element, second element, and the dielectric material are carried on a support member of said logging device, and the length of the first element is selected and the dielectric material is shaped to be compatible with the shape and dimensions of the support member.

Other objects, features, and characteristics of the present invention will be apparent upon consideration of the following Detailed Description and the appended claims, with reference to the accompanying Drawings, all of which are part of this Specification.

BRIEF DESCRIPTION OF THE DRAWINGS

In the figures, where like reference characters indicate like elements,

FIG. 2 is an equivalent electrical circuit diagram representative of an exemplary coil antenna;

FIG. 3 is a perspective elevation of an exemplary bi-plate antenna;

FIG. 4 is a side elevation in cross section of the exemplary bi-plate antenna of FIG. 3;

FIG. 5 is an equivalent electrical circuit diagram representative of the exemplary bi-plate antenna of FIG. 3;

FIG. 9 is a side elevation, partly in cross section, of a mandrel-type electromagnetic logging tool having antennas of the type shown in FIG. 6, in accordance with the present invention;

FIG. 10A is a side elevation, partly in cross section, of another mandrel-type electromagnetic logging tool having antennas of the type shown in FIG. 6, in accordance with the present invention;

FIG. 10B is an enlarged view of a detail of FIG. 10A taken along a longitudinal diametrical plane;

DETAILED DESCRIPTION OF THE PREFERRED EMBODIMENTS

Figure 1:
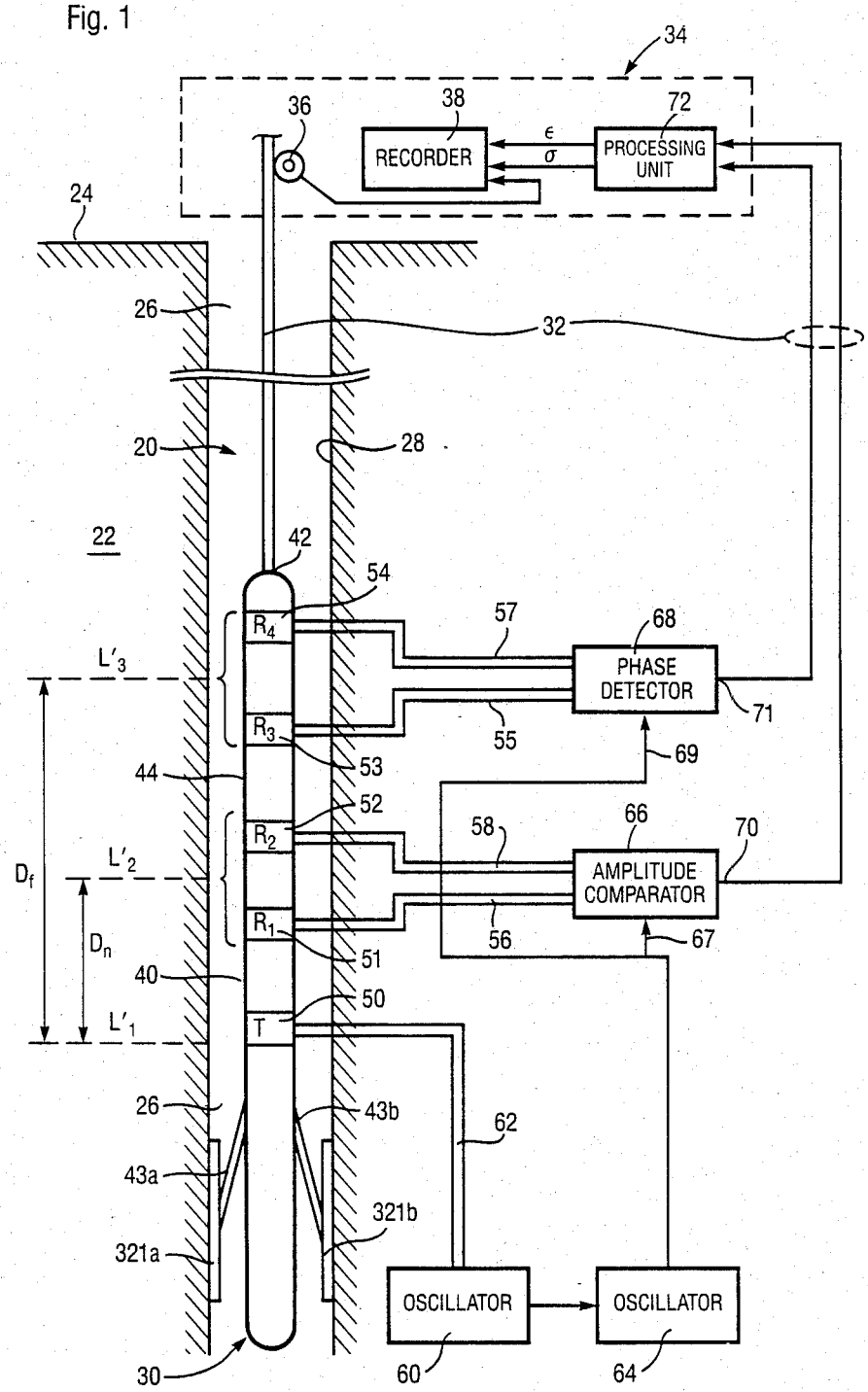
FIG. 1 is a schematic diagram of an exemplary electromagnetic logging tool useful for discussing certain features of the present invention.

A borehole 20 (FIG. 1) passes through geological formations 22 from the surface of the earth 24 in a substantially vertical direction defining, for example, a wall 28. The borehole 20 is filled with a drilling fluid 26, the density of this drilling fluid or drilling mud being determined and adjusted so that the hydrostatic pressure exerted by this fluid on the wall 28 of the borehole 20 balances the internal pressure of the traversed formations to maintain the integrity of the wall 28. An electromagnetic logging tool 30 is suspended in borehole 20 at the end of a cable 32, which supports tool 30 mechanically during its movements in the borehole 20 and provides electrical connection of the tool 30 to a surface station 34. The electrical connection is reproduced in the right side portion of FIG. 1, to allow a clear presentation thereof. At station 34, the cable 32 runs over a wheel 36 whose angular movement makes it possible to follow the variations in depth of the tool and to control the driving of a recording medium, magnetic or photographic for example, in a recorder 38 to obtain a record or log of data transmitted by the tool 30 via the cable 32 as a function of the depth of the tool 30.

The tool 30 comprises an elongated sonde body member or mandrel 40 suspended by its upper end 42 to the cable 32 and which includes an outer casing 44 designed to isolate the functional parts of the tool from the borehole 20. In the vicinity of the lower end of the mandrel 40 at location $L'_1$ is mounted a transmitter 50 ("T") comprising an antenna capable of transmitting electromagnetic energy at radio frequencies into the environment of the borehole 20 and the surrounding formations 22. Over the transmitter 50 is mounted, on the mandrel 40, a first pair of receiving antennas 51 and 52 ("R1" and "R2") spaced vertically a predetermined distance. The distance between the transmitter 50 and the center of the interval between the receivers R1 and R2, indicated at $L'_2$, is $D_n$. Over this pair of antennas is mounted, on the mandrel 40, another pair of longitudinally spaced receiving antennas 53 and 54 ("R3" and "R4"). The center of the interval between these antennas, indicated at $L'_3$, is located at a distance $D_f$ from the antenna 50. The distance $D_f$ preferably is greater than $D_n$.

The transmitter 50 is capable of transmitting an electromagnetic wave within a dihedral of 360° around the centerline of the mandrel 40. It is supplied through an oscillator 60 housed inside the casing 44 via a coaxial link 62. The oscillator 60 also controls an oscillator 64 which operates at a frequency slightly higher or slightly lower (a few tens of kHz difference).

The receiving antennas 51, 52 (R1 and R2) are capable of detecting electromagnetic radiation reaching them after propagating through the formations 22 within a dihedral of 360° around the centerline of the borehole 20. They are connected to an amplitude comparator 66, which also is supplied with the output frequency of the oscillator 64 on an input 67.

The receiving antennas 53 and 54 (R3 and R4) are connected to the inputs of a relative phase detector 68, which also is supplied with the output frequency of the oscillator 64 on an input 69.

The receiving antennas 51, 52 are connected to the amplitude comparator 66 by coaxial cables 56 and 58 respectively. The receiving antennas 53 and 54 are connected to the phase detector 68 by coaxial cables 55 and 57 respectively. The two circuits 66 and 68 each include a mixer for the signals coming from the oscillator 64 and the signals received from the antennas 51, 52 and 53, 54 respectively, in order to derive therefrom a signal whose frequency is relatively low (a few tens of kHz) to facilitate the determination of the difference in the amplitude of the signals received by the receivers R1 and R2 and the phase shift of the signals received by the receivers R3 and R4. The two types of corresponding information are available at the outputs 70 and 71 of the circuits 66 and 68 respectively, and are transmitted to the surface via cable 32 to a processing unit 72 capable of supplying the recorder 38 with signals representing for example the dielectric constant and/or the conductivity of the formations through which the waves transmitted by the transmitter 50 propagate. The cable 32 also supplies power (not shown) to the oscillators 60 and 64 as well as the electronic circuits 66 and 68 which are housed in the sonde 40.

A tool having the general structure described with reference to FIG. 1 but having coil antennas is disclosed in the aforementioned Huchital and Tabanou Patent, which hereby is incorporated herein by reference.

An antenna 99 of the bi-plate type (FIG. 3) comprises two metallic elements placed on each side of a dielectric, as practiced for example in the manufacture of printed circuit boards. A flat dielectric plate 100 includes, on one of its sides 101, a first element comprising a conducting strip 102 of copper, a curved form in this example, printed on the dielectric 100. This dielectric can be for example a high-temperature ceramic. Side 103 opposite to side 101 of the plate 100 is entirely covered with a metal coating 105 of, for example, copper, aluminum or Invar (Trademark), which is a second element. One end 106 of the metal strip 102 is connected electrically to the metal sheet 105 by a short-circuit connection 108 through the dielectric 100. A coaxial cable 109 reaches the antenna 99 on its bottom side 103. The sheath of this coaxial cable 109 is connected electrically to the plate 105 while its core, after having gone through the dielectric, is connected to the strip 102 at a point 110 located at a predetermined distance from the end 106. The strip 102 has a curvilinear length on the plate 100 between its end 106 and its other end left electrically free (shown at 107 in FIG. 4) equal, in this example, to one-fourth the propagation wavelength of the operating frequency of the antenna. When the length of such an antenna is equal to one-fourth the wavelength of the electromagnetic or to a multiple thereof, the input impedance of this antenna is purely real, which is a requirement for the optimum efficiency of this antenna. The sheet 105 is generally designated as the ground plane, the strip 102 being regarded as forming the radiating element proper.

In this type of antenna, the conducting elements separated by the dielectric are placed opposite each other. On the other hand, it is not indispensable that the second conducting element, corresponding in the example of FIG. 3 to the plate 105, should extend over a surface. It is possible to obtain antennas in which the second element is also elongated along a path substantially parallel to that of the first element and placed opposite thereto. The arrangement in which this second element extends along a plane or a ground surface is advantageous, as discussed below.

When the operating frequency of the antenna is relatively low, for example of the order of a few tens of megahertz, one-fourth the corresponding wavelength in air represents a relatively long length compared with the dimensions of logging tools in boreholes. In the case of a frequency of 25 MHz, one-fourth the propagation wavelength of the radiation in air is equal to about 3 meters. When the antenna, instead of being mounted in air, is placed on a dielectric material (FIG. 3, for example), the wavelength radiated in this dielectric for a given frequency is lower than that of the radiation in air because of the higher value of the dielectric constant of the material.

This is explained with reference to the relationship (2) defining the propagation constant. When the conductivity $\sigma$ of the medium in which the antenna is placed is zero, the following relationship holds:

$$k = \omega \sqrt{\mu_o \epsilon} \qquad (3)$$

When the conductivity is zero, the propagation constant is $$k = 2\pi/\lambda \qquad (4)$$

so that:

$$\lambda = \frac{2\pi}{\omega} \frac{1}{\sqrt{\mu_o \epsilon}} \qquad (5)$$

It is verified that if the electrical permittivity $\epsilon$ of the dielectric material on which is printed the first element is higher than 1 (i.e. higher than the permittivity of air or vacuum), the propagation wavelength of the radiation in this medium decreases as a function of the square root of this permittivity. For a dielectric medium with a permittivity of 4, the corresponding wavelength will thus be about half that of the propagation of the radiation at the same frequency in air. The result is that the length of an antenna tuned on one-fourth or on one-half the wavelength is halved when this antenna is placed on a dielectric. Under these conditions, at 25 MHz, the antenna length necessary for obtaining proper transmission efficiency in this dielectric is equal to 1.5 meters. Various arrangements are provided herein for building these relatively low frequency antennas with minimum overall dimensions on a well logging tool.

As the frequency of the signals to be transmitted increases, the corresponding wavelength decreases and it is possible to select the antenna length equal to half the wavelength of the radiation in the dielectric. In this latter case, one short-circuits the two ends of the first element such as 102 with the ground plane 105. Of course, as the frequency of the electromagnetic waves to be transmitted increases, it is possible to increase the length of the antenna relative to the wavelength in the dielectric, thereby improving efficiency It has been determined that the use of antennas of the bi-plate line type, suitably improved, is advantageous in the particular conditions and requirements of electromagnetic logging tools. The insulating material plate can be mounted so that one of its sides on which the first conducting element is printed appears on the surface of a mandrel-type tool or on the surface of a pad of a pad-type tool. This conducting element can if necessary be wound on the mandrel or pad surface to give the antenna the desired electrical length while keeping its mechanical length within dimensions compatable with those of the tool. Furthermore, this mechanical length can be selected according to the directivity characteristics of the tool. The directivity of an antenna depends on the phase shift of the currents per unit mechanical length along this antenna. It is advantageous for the antenna length to be sufficient so as to obtain current phase shift which favors the action of the antenna in certain directions; for example, the propagation of radiation in the surrounding medium between a transmitting antenna and a receiving antenna, transverse to the mandrel of the tool. This can be obtained, for example, by providing an antenna mechanical length of the order of magnitude of the radiation wavelength in the medium outside the antenna.

Tests conducted with antennas of the bi-plate type have shown, firstly, that these antennas are satisfactory for exchanging electromagnetic radiation energy with highly dissipative borehole media for the study of the propagation of electromagnetic radiation in these media and, secondly, that these antennas achieve considerable efficiencies, in transmission as well as reception, for the measurement of electromagnetic propagation, compared with the coils traditionally used in this area.

As concerns the first conclusion, in the particular case of well logging tools which are called upon to operate in drilling mud (a highly dissipative medium), the effectiveness of these antennas is better than than their effectiveness in air or vacuum, all else being equal. It has been determined that bi-plate antennas have excellent efficiency in the environment of boreholes at much lower frequencies than their current utilization frequency in air or vacuum. This is the case in particular at frequencies of a few tens of megahertz corresponding to those used in deep-investigation electromagnetic propagation tools.

The following approximate relationship provides an explanation:

$$R_r \simeq k(l/\lambda)^2 \tag{6}$$

in which $R_r$ is the radiation resistance of the antenna; $l$ is the mechanical length or effective height of this antenna; and $\lambda$ is the propagation wavelength of the radiation in the medium in which the antenna is immersed. The energy of the radiation received or transmitted by an antenna is of an active nature, and the radiation resistance $R_r$ is the value of the theoretical resistance which would be produced by a thermal dissipation of energy equivalent to the radiated energy. Thus, the greater the radiation resistance of an antenna, the greater will be the power it is capable of transmitting. The efficiency $\eta$ of the antenna can be characterized by the radiation resistance corresponding to a useful transmission of energy and a loss resistance $R_p$ in the relationship:

$$\eta = R_r/(R_r + R_p) \tag{7}$$

Specifically, the radiation resistance $R_{ro}$ of an antenna immersed in air or in a vacuum is:

$$R_{ro} \simeq k(l/\lambda_o)^2 \tag{8}$$

in which $\lambda_o$ is the wavelength of the radiation in air. In water, the wavelength of the radiation is, according to the relationship (5) above:

$$\lambda_{water} = \lambda_0 / \sqrt{\epsilon_r} \tag{9}$$

The dielectric constant of water, $\epsilon_r$, is equal to about 80, whereupon the resistance $R_r$ in water is about 80 times higher than in air. The result is that, for a given efficiency $\eta$ of the antenna in air, the corresponding efficiency of the same antenna in water is very substantially higher and near unity to the extent that the loss resistance $R_p$, which has not changed, can be considered negligible in comparison to the radiation resistance of the antenna in water.

The relationship (5) is valid for a nonconducting medium. As will be appreciated from consideration of the relationship (2) defining the propagation constant, in practice, if the conductivity $\sigma$ of the surrounding medium in the antenna is not zero, the propagation wavelength tends to decrease further compared with its value in a nonconducting medium.

The second conclusion mentioned above (that it is possible to achieve considerable efficiencies for the measurement of electromagnetic propagation as compared with coils) can be explained with reference to FIG. 2, which is an equivalent circuit diagram of a traditional coil radiating system. A traditional coil 81 comprising inductance coil 80 connected in series with a resistor 82, is supplied with electromagnetic energy by an oscillator 86 at the output of a coaxial cable 84. Coil 81 is very highly reactive due to the high value of the inductance coil 80, where as the coaxial cable 84 supplying this coil is designed to give it an essentially active energy to be radiated. As a result, standing waves are established between the oscillator 86 and the input of the coil 81. The maintenance of these standing waves consumes a very large fraction of the energy which transits through coaxial cable 84. Under these conditions, the efficiency of the transmission of energy between the oscillator 86 and the coil 81 hardly exceeds 10%. Furthermore, only part of the energy reaching the coil 81 (in the case of a transmitter) is transformed into radiating energy capable of propagating outside of the logging tool. Considerable ohmic losses occur in the winding of coil 81. To these ohmic losses are added dielectric losses resulting from the capacitive link between the conductors of the coil proper and the other parts of the tool, which are grounded. Thus, the power radiated outside the coil represents only a fraction of a few percent of the power actually reaching this coil. In all, the power radiating by a coil type radiating system is hardly more than about 1% of the power available at the output of the supply oscillator. The same phenomena holds for the receiving coils.

As mentioned above, the efficiency of a bi-plate radiating and receiving antenna suitable for borehole use is markedly improved with respect to coil antennas. For example, an efficiency improvement of a factor of 50 means that the power corresponding to the received signals for a given electric signal transmitting power is 2500 times higher. The useful powers which can be used for the study of propagation are thus of a significantly greater order of magnitude than previously was possible to achieve.

Numerous advantages have been recognized as a result of this improved efficiency. The use of simplified (and therefore more reliable) detection electronics associated with the receiving antennas R1 to R4 (FIG. 1) is possible. Furthermore, since the very large increase in efficiency is obtained with antennas having overall dimensions of the same order as known coil antennas, a suitable bi-plate antenna can be mounted on a logging mandrel of conventional diameter. In fact, unlike coil antennas whose efficiency increases with increasing diameter, the efficiency of antennas according to the present invention and consequently the amount of radiating energy capable of being radiated by these antennas is independent of their diameter. Moreover, the use of antennas of the present invention makes available a greater amount of space for housing the electronics, even when a transmitter is supplied at the base of the tool by means of power conductors coming from the surface. Alternatively, the length length of the tool may be reduced. Generally, the high efficiency available with antennas of the present invention allow greater flexibility in improving the characteristics of electromagnetic logging tools, since the compromising of some antenna efficiency for an improved characteristic can be tolerated. Furthermore, the availability of higher levels of radiated power makes it possible to apply the electromagnetic propagation method of investigating formations with much more highly conductive drilling muds than in the past since a much higher rate of attenuation of the radiated energy in the mud surrounding the borehole can occur without resulting in lower signal level at the receiving antennas than previously available. It is thus possible to work in muds with resistance of as low as 0.05 ohm, which includes almost all the drilling muds presently used. Some of these advantages are referred to below in the context of specific embodiments.

In contrast with traditional coils, radiation transducers in accordance with the present invention are virtual antennas whose length can be easily tuned according to the frequency of the radiations they are to transmit so as to give them an essentially active impedance, a requirement for efficient operation. A diagram of a longitudinal section of a bi-plate antenna is given in FIG. 4 in which the same reference characters have been used as in FIG. 3. An oscillator 112 is connected to one end 113 of the coaxial line 109 whose other end is connected through its sheath 114 to the ground plane 105, perpendicular to the latter, the core 115 of this link being insulated from the ground plane 105 and going through the dielectric 100 to reach the junction point 110. The ground plane 105 constitutes an electrical screen between the strip 102 constituting the sensitive part of the antenna 110 and the electronic circuits located behind the ground plane. The junction point 110 of the core 115 of the coaxial cable 109 is located at a distance d from the short-circuited end 106 of this antenna 99, which is chosen to provide impedance matching by having the element 102 play the role of an autotransformer as will be explained below.

A diagram, represented in FIG. 5, equivalent to the antenna 99 between the ends 106 and 107 of the strip 102 includes a wound inductance coil L whose number of turns corresponds to the length of this strip and a capacitor C equivalent to the capacitive link existing between the strip 102 and the ground plane 105. The ground plane 105 is connected to ground. The LC circuit in parallel represents a resonant circuit equivalent to the antenna. For an antenna length equal to one-fourth the wavelength radiated in the dielectric, the impedances of the circuit containing the inductance coil L and of the circuit containing the capacitor C correspond to the resonance condition which allows the optimum conversion of electrical energy into radiating energy. A resistor R connected in parallel with the components L and C between the ends 106 and 107 of the antenna represents an impedance equivalent to the conduction losses in the antenna and to the radiated power (radiation resistance), this power being, as indicated earlier, a purely active power. The junction point 110 is an intermediate point of the inductance coil which corresponds to a number of turns $n_i$ of this coil between the ground plane 105 and the junction 110, $n_t$ being the total number of turns of the inductance coil L. The position of the junction 110 is chosen so that the value $R(n_i/n_t)^2$ is substantially equal to the impedance of the coaxial connection line 109. The coil L plays the role of an autotransformer whose impedance relative to the input can be calculated, namely $R(n_i/n_t)^2$. If this impedance is equal to the impedance of the coaxial line used with the antenna, energy losses by reflection in the coaxial are eliminated entirely.

The technological features of bi-plate antennas therefore, include the potential increases in the available power in the environment specific to logging tools in boreholes and other advantageous consequences which will be examined below in relation to the various embodiments and uses of antennas for electromagnetic logging tools.

Figure 6:
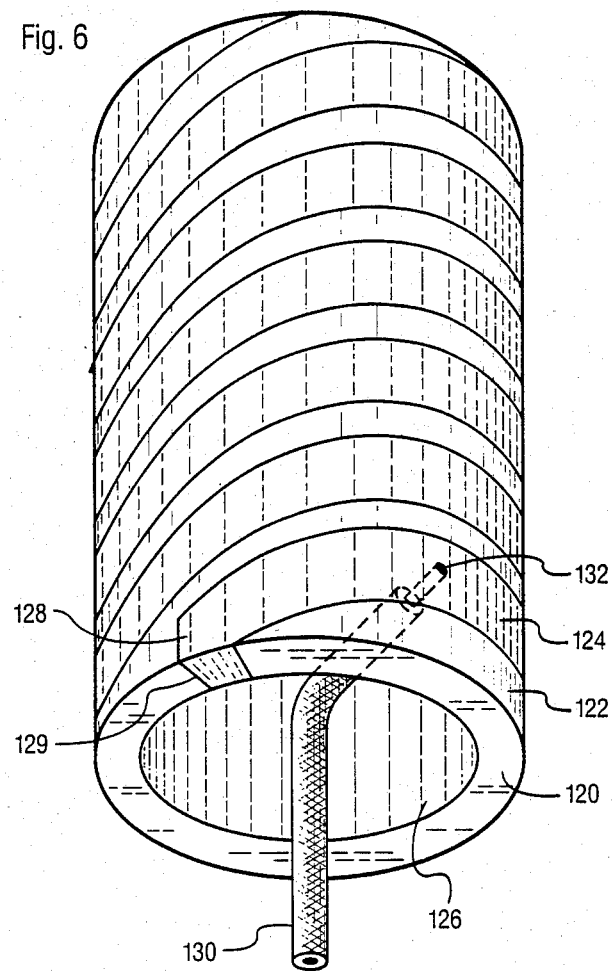
FIG. 6 is a perspective elevation of an antenna for a mandrel-type electromagnetic logging tool, in accordance with the present invention.

For example, in a bi-plate antenna for a mandrel (FIG. 6), a first conducting element 124 of the antenna is wound in the form of a spiral with a regular pitch around a cylindrical sleeve 120 of dielectric material whose internal face is covered with a conducting sheet 126 forming the second conducting element or ground element. The conducting element 124 is a copper strip printed in the surface 122 of the sleeve 120 over an unfurled length equal, at the selected frequency, to one-fourth of the propagation wavelength of the radiation in the material making up this sleeve 120. The winding pitch of the strip 124 is relatively tight and the longitudinal spacing between the turns of this strip is, as shown, substantially smaller than the width of this strip 124.

The sleeve 120 comprises a ceramic or glass-fiber or resin-based composite material. The strip 124 is embedded in it using a conventional printing technique of the type used in the manufacture of printed circuits (for example, by engraving or electroplating). The lower end 128 of the first element 124 is connected electrically to a high-frequency power source via a coaxial line 130 having a core connected at a point 132 of the internal face of the helical strip 124 (i.e. the face in contact with the dielectric 120). The core of this coaxial line goes through this dielectric perpendicular to the internal surface of the dielectric sleeve 120, the sheath of the coaxial cable being connected to the cylindrical ground element 126. Such an antenna is capable of being mounted coaxially on the mandrel of a logging tool such as the one represented in FIG. 1 to form the transmission and reception elements 50 and 51-54 respectively.

A suitable antenna comprises, for example, eight turns of a copper strip having a thickness of one-tenth of a millimeter and a width (dimension measured in the axial direction) of 5 millimeters, wrapped in a spiral having a pitch of 7.5 millimeters, on a sleeve having an external diameter of 8 centimeters. The internal surface of the sleeve 120 is covered with a metal sheet 1 millimeter thick forming a ground plane. The insulating sleeve 120 comprises a polysulfone and has a thickness of 5 millimeters. For operation at 25 megahertz, the antenna tuned on one-fourth the wavelength of the propagation wave of this frequency in the dielectric material of the sleeve 120 has an unfurled length of about 2 meters and a total length in the axial direction of 6 centimeters. With the antenna length is adjusted to one-forth the wavelength of the radiation in the dielectric, the resonance condition of this antenna is achieved without any other special arrangement, and in particular without requiring special tuning circuits. Measurements of the efficiency obtained with such an antenna operating in salt water have provided values of the order of 90%, i.e. an order of magnitude incommensurate with what was possible with prior art coils.

The transmitting antenna and the receiving antennas are separated by portions of insulating tubes to which they are connected by suitable means, for example connection sleeves. According to another arrangement, these antennas are placed around a common insulating internal sleeve supported longitudinally in the mandrel 40. According to yet another arrangement, the casing 44 of the sonde body member is formed, at least over part of its length, by an extension of an antenna sleeve such as 120 (of FIG. 6) over the useful height of the mandrel, another similar sleeve then being used as a support for the first and second conducting elements of the various transmitting and receiving antennas.

According to one particularly advantageous embodiment, the ground element 126 of each of the antennas T, R1, R2, R3, and R4 (of FIG. 1) from part of a single conducting cylindrical sleeve extending over the entire height. The conducting sleeve thus formed inside the tool acts as a screen for the transmitting and receiving antennas to suppress all disturbing signals flowing in conductors within the body of the tool, including, for example, the power supply current of the oscillator 60. In fact, the conductors which supply the oscillator 60 may be surrounded with a screen comprising longitudinal metal tubes, since the operation of bi-plate antennas is not influenced by the presence of this tube. Furthermore, the diameter of such a tube can be enlarged to house the reciever electronics and the other functional devices of the tool. This can allow a shortening of the tool and an increase in the electronic processing capacity inside the tool.

The cylindrical ground elements of the antennas (such as 126 of FIG. 6) themselves may be used as screens with respect to the disturbing signals in the power supply cables of the oscillator 60 (and in any other electronic circuit necessary for the operation of the tool) by connecting them to one another by means of metal connecting tubes so as to form a continuous cylindrical sheath. Thus, the screen tube formed by this sheath is integrated in the antenna sleeves placed at a small distance from the periphery of the casing of the mandrel 40 and clears the internal central part of the tool.

In certain cases, however, the metal screen sheath, in combination with the mud column surrounding the mandrel 40 and insulating media separating them, can act as a coaxial link in which part of the electromagnetic energy emitted at the output of the transmitter 50 would be propagated according to a transverse propagation mode known as the transverse electromagnetic (TEM) mode. This mode may have an amplitude much greater than that of the signals to be received (particularly at the most distant receiving antenna) and is liable to completely obscure the received signals. It is thus important to seek to avoid this propagation mode and to concentrate the greatest possible part of the energy leaving the transmitter 50 (T) toward the wall of the borehole and the surrounding formations.

Figure 7:
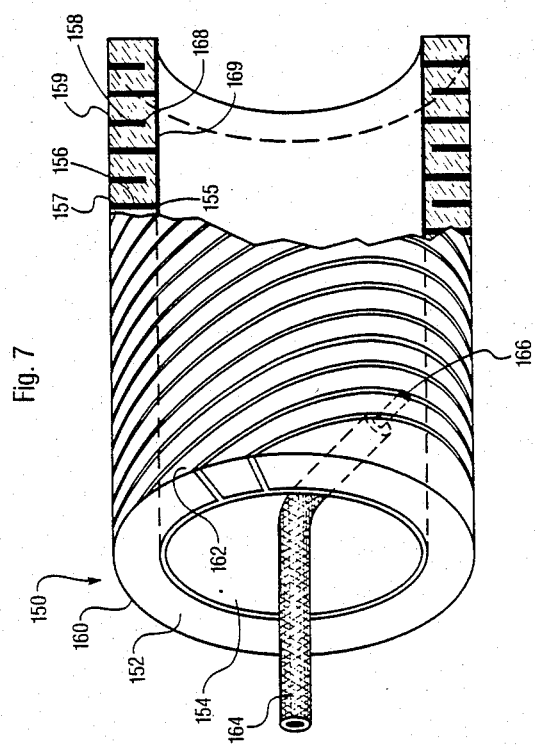
FIG. 7 is a perspective elevation, partly in cross section, of another embodiment of an antenna for a mandrel-type electromagnetic logging tool, in accordance with the present invention.

According to another embodiment, therefore, provision is made for limiting TEM mode transmission and reception by arranging the conducting element wound around the sleeve of the coaxial antenna in the mandrel edgewise as illustrated in FIG. 7. FIG. 7 shows an antenna 150 comprising a dielectric sleeve 152 having, on its internal face, a cylindrical ground conductor 154 connected to a cylindrical sheath (not shown) which goes through the entire height of the tool and connects in particular all the corresponding ground conductors of the other antennas. Around this ground cylinder 154 is wound, in electrical contact with cylinder 154 along an edge 155, a metal strip 156 which is placed edgewise along a plane approximately perpendicular to the surface of the cylinder 154 and wound spirally around the latter over a length of sleeve 152 corresponding to the length of the antenna. The outer edge 157 of the strip 156 is flush with the external surface 160 of the dielectric sleeve 152. A conducting metal strip 158 forming the first element of the antenna is wound spirally in the thickness of the sleeve 152, forming turns arranged on edge and inserted between the turns of the strip 156 and whose outer edge 159 is flush with the outer surface 160 of the dielectric sleeve 152. The strip 158 is connected electrically at one of its ends 162 to the metal coating 154 lining the inside of the dielectric sleeve 152. The antenna thus formed is connected to a coaxial cable 164, one end of which is perpendicular to the internal surface of the sleeve 152. The sheath of this cable is connected electrically to the ground cylinder 154 and the core of this conductor is connected to the strip 158 at a point 166, at a distance from the end 162 suitable to achieve the impedance matching discussed above. The helical winding of the strip 158 extends over a distance along the cylinder 152 corresponding to the antenna length desired.

This arrangement makes it possible to reduce the electromagnetic energy transmissions in the direction parallel to the centerline of mandrel 44. The formation of waves capable of propagating in the TEM mode inside a coaxial line depends on the capacitance distributed between the turns of the first antenna element 158 and the mud column surrounding a tool. The value of this capacitance depends on the effective surfaces of the oppositely located plates. In the case of FIG. 7, the surface of the edge of the turns 158 which are opposite the mud column is very small and thus contributes in a minimal manner to the formation of waves transmitted according to the TEM mode.

Figure 8:
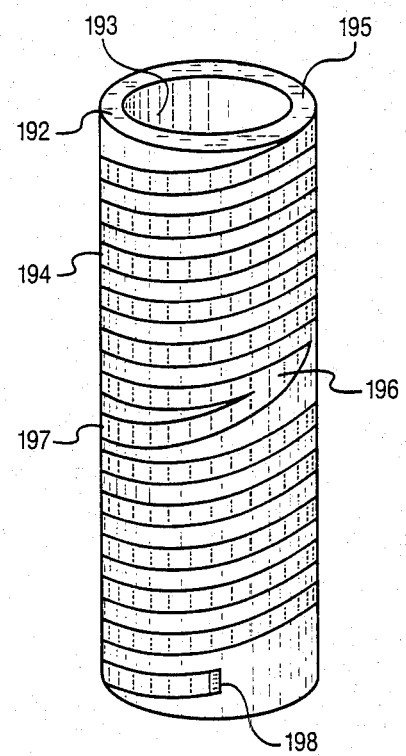
FIG. 8 is a perspective elevation of yet another embodiment of an antenna for a mandrel-type electromagnetic logging tool, in accordance with the present invention.

Yet another arrangement for controlling the propagation of the TEM mode is shown in FIG. 8 where preference is given to the spiral winding of the first or radiating/receiving element of the antenna in the form of two longitudinal portions wound in equal pitches but in opposite directions. Thus, on a dielectric sleeve 192 whose inner surface is covered with a metal coating 193 forming a cylindrical grouhd element, a portion 194 of an external metal strip is wound spirally, beginning at an end 195 which is short-circuited to the ground cylinder 193. The portion 194 is wound spirally at a given pitch in a given direction up to a turning point 196 at the midpoint of the antenna. At point 196, the pitch is reversed to form the turns of portion 197. The end 198 of portion 197 of the strip is short-circuited to the ground plane. The total length of the antenna is tuned to half the wavelength of the wave in the dielectric 192. It is supplied at respective points near the ends 195 and 198 by two coaxial cables, the respective voltages being supplied therethrough being in phase opposition. Two quarter-wave antennas, in series and geometrically opposite are obtained. Since the current has the same direction, however, radiation in the desired mode is favored, while the electrical fields corresponding to the voltage between each of the portions 194 and 197 of opposite pitch and the mud column have different signs and opposite effects which tend to cancel the TEM mode.

According to another mounting embodiment intended to avoid propagation of the TEM mode, a sonde 200 (FIG. 9) comprises a cylindrical mandrel in the form of an external metal casing 202. Around this casing are placed, at several longitudinally spaced locations 204a–204e, suitable bi-plate antennas 206a–206e (such as, for example, the type of FIG. 6). As represented at the top of FIG. 9 (which shows the sonde 200 partially cut by a longitudinal diametrical plane) the external metal casing 202 has, at each location 204a–204e, a part 208 of reduced outer diameter which constitutes by itself a cylindrical ground element for each antenna 206a–206e. The reduced part 208 is covered with a dielectric sleeve 209 around which is wound a helical metal strip 210, one end of which is short-circuited to the reduced part 208 of the casing 202. The combined thickness of the dielectric 209 and the winding 210 is such that the overall diameter is smaller than the diameter of the casing 202 in the part 212 between for example locations 204d and 204e. The part 212 and neighboring parts of like design and purpose are connected to each other by a series of bars 214 of longitudinal dimension passing over each winding 210 to thus form a cage of parallel bars around the antennas 206 to provide mechanical protection. The longitudinal bars 214 are integral with the casing 202. In this embodiment, the cylindrical ground element of the antennas is in direct electrical contact with the mud 202. No TEM mode propagation exists in the absence of a structure of the coaxial type with a dielectric between an internal conductor and the mud column surrounding the tool.

According to yet another mounting embodiment intended to avoid propagation of the TEM mode (FIG. 10A), the envelope of a sonde 220 is made up of a cylindrical metal tube 222 extending over the entire length of the tool. Around the tube 222 are mounted, in longitudinally spaced positions, a transmitting antenna 224 at the bottom of the tool and a series of receiving antennas 226a, 226b, 226c and 226d, each of a suitable bi-plate type (such as, for example, the type of FIG. 6). The tube 222 forms a cylindrical ground element common to the antennas 224 and 226a–226d. Each of the antennas 224 and 226a–226d includes a dielectric coating or sleeve 229 placed directly around the external surface of the casing 222. Around each dielectric sleeve 229 (FIG. 10B) is wound spirally a radiating metal strip 230 connected electrically to the casing 222 at one of its ends 231. The winding 230 is embedded in a glass-fiber-based insulating coating 232 which gives it mechanical protection against shock and abrasion due to the movement of the tool inside the borehole, as well as chemical protection against corrosion. A coaxial cable 234 connects to the antenna 224 (for example) through the casing 222. Its sheath is connected electrically to this casing. The core 235 is connected as described above to provide impedance matching.

The internal electronics necessary for the operation of the tool is housed (shown in cross-section in FIGS. 9 and 10A) in the internal space delimited by the conducting tubes 202 and 222. In FIG. 10A, for example, supports 240 hold electronic processing cards capable of being connected to receiving antennas 226a–226d by means of coaxial cables 241, 243, 245 and 246, as shown. The makeup of the electronic circuits and of the appropriate connections for the transmitting antenna 224 and for the processing of the signals from the receiving antennas 226a–226d is well known and is described, for example, in the above-mentioned Huchital and Tabanou Patent.

Generally, the present invention, because of the large efficiency improvement realized, also allows for improvement in the resolution of the investigation while maintaining a desired investigation depth. To attain improvement in resolution, it is necessary to increase the measurable values of attenuation and phase shift of the electromagnetic waves propagating in a formation zone of a given thickness. The frequency of operation of known electromagnetic logging tools can not be increased to improve resolution because the higher frequency electromagnetic radiation would be more greatly attenuated, resulting the inability to detect and process suitable signals at the receiving antennas, especially at the far receiving antenna. The markedly greater efficiency of the antennas of the present invention, however, permits the radiation of energy at a sufficiently strong power level (using power of a conventional order of magnitude at the transmitter) to tolerate the greater attenuation incurred by higher frequency operation, limited by the requirement for an acceptable signal level at the receiving antennas.

The power transmitted with antennas of the type described is sufficient for reaching investigation depths of the order of 1 to 2 meters with antennas mounted on a mandrel within a frequency range extending as high as about 60 or 80 MHz. The resolution obtained for this operating frequency is about 60 centimeters to 1 meter. As soon as the operating frequency exceeds several tens of megahertz, it is possible to adjust the length of the radiating element of a bi-plate mandrel-type antenna to a half-wavelength and, as the frequency increases further, to a wavelength or more, since the wavelength decreases as the frequency increases while the longitudinal length available for the antenna need not change.

The greater efficiency of the antennas of the present invention is further advantageous in that relatively low frequency operation is not precluded. In the range of relatively low frequencies, the ideal antenna length necessary for obtaining quarter-wavelength tuning is not compatible with traditional tool dimensions. Regardless, the loss of efficiency due to operation of these antennas at these relatively low frequencies can be tolerated because the markedly great intrinsic efficiency of these antennas compensates for any such loss. Accordingly, these antennas are attractive for operation at frequencies very substantially lower than 20 MHz, and in some applications below 1 MHz. At these frequencies, the useful length of the radiating element wound around the mandrel (first conducting element) is reduced by modifying the connections between this element and the ground elements of the antenna.

Figure 11:
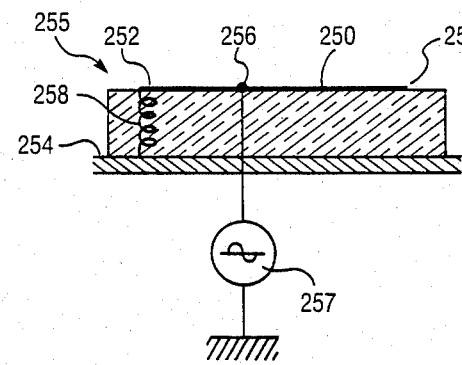
FIGS. 11 and 12 are equivalent electrical circuit diagrams representative of respective bi-plate antennas in accordance with the present invention having physical lengths less than one-fourth wavelength.

Specifically, low frequency logging applications may require that the radiating element be shorter than one-fourth wavelength. A radiating element 250 of a bi-plate antenna 255, made up of a metal strip 250 (represented in FIG. 11) may have a length smaller than one-fourth wavelength if, instead of being short circuited with the ground plane 254, the end 252 of the element 250 is connected to the ground plane 254 by an inductance coil 258 dimensioned so that the resonating assembly formed by the radiating element 250 and the inductance coil 258 coupled in parallel by the linear capacitance between the two conducting elements of the elements 250 and 254 constitute a circuit tuned for the desired frequency. The application point 256 is connected to an oscillator 257. The other end 253 of the element 250 is electrically free.

Figure 12:
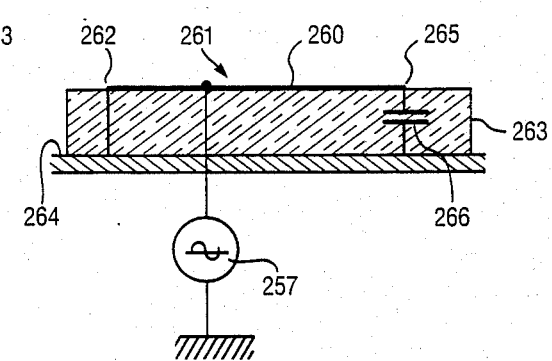

In an alternate embodiment (FIG. 12) of an antenna 261 designed to operate at a relatively low frequency, a radiating element 260 with a length smaller than one-fourth the radiation wavelength in the dielectric 263 at the desired resonant frequency has one of its ends 262 connected in short circuit to a ground plane. The other end 265 is connected to the ground plane 264 via a capacitor 266, whose value is chosen so that the circuit equivalent to the radiating element 260 and to the capacitor 266, in combination with the linear capacitance existing between the element 260 and the ground plane 264, constitutes a resonant circuit for the operating frequency of the oscillator 257.

Another approach to reducing the length of the radiating element wound around the mandrel, which can be combined with the preceding for application requiring even lower frequency investigation, involves the use of a material with a high magnetic permeability instead of a dielectric material between the two conducting elements of the antenna. While the dielectric constants of most suitable materials compared to the dielectric constant of air generally does not exceed 20:1, the proportion of the magnetic permeability of certain suitable materials in relation to that of air can reach several thousand when the frequency is less than about a few tens of megaherts. In relationship (5), the wavelength is inversely proportional to the square root of the magnetic permeability. Magnetic materials are available whose Curie point is sufficiently high so that the high magnetic permeability is maintained throughout the range of temperatures at which well logging tools are used. For example, ferromagnetic alumina (whose magnetic permeability is about 250 and whose Curie point is sufficiently high), when used in an antenna having a length of 38 meters, permits operation at a frequency of 500 kHz. Such an antenna length can be achieved by means of a winding of 120 turns on a mandrel of 10 cm diameter.

One thus obtains a logging tool based on electromagnetic radiation propagation capable df operating at a relatvely low frequency (lower than 1 MHz), a frequency at which the measurements of the parameters relative to the propagation of electromagnetic waves in the formation are predominently influenced by the conductivity of the surrounding media rather than by the dielectric constant of these media. By placing the antennas on a metal mandrel, as explained above, one obtains a new conductivity tool which, unlike conventional conductivity tools, does not require the use of an insulating mandrel over a large part at least of its length. This new type of tool has the advantages of simplicity, ruggedness and dimensional stability.

This new structure also makes it possible to combine a conductivity measurement tool with an electrode-type resistivity measurement tool by combining antennas that operate at a relatively low frequency, as described above, with metal sleeves placed around the mandrel that constitute an electrode system such as disclosed, for example, in U.S. Pat. No. 2,712,627 (issued July 5, 1955 to Doll), which hereby is incorporated herein by reference. A combination tool of this type comprises (FIG. 17) a tool 400 on which is mounted a central electrode $A_O$. On each side of $A_O$ are symmetrically placed two pairs of potential measuring electrodes $M_1$, $M_2$ and $M'_1$, $M'_2$. Symmetrical about $A_O$ beyond the potential measuring electrodes $M_1$, $M_2$, $M'_1$, $M'_2$ are placed in succession first current electrodes $A_1$ and $A'_1$ and second current electrodes $A_2$, $A'_2$. The electrodes are made up of conducting rings at the surface of the mandrel, the electrodes $A_2$ and $A'_2$ taking the form of elongated sleeves. The power supply and control circuits of these electrodes are described in, for example, U.S. Pat. No. 3,772,589 (issued Nov. 13, 1973 to Scholberg), which hereby is incorporated herein by reference. Currents circulating in the electrodes $A_O$, $A_1$ and $A_2$ and $A_O$, $A'_1$ and $A'_2$ and zones at greater or lesser distances from the tool 400 in the surrounding medium are controlled so that the difference in potential between the measurement electrodes $M_1$ and $M_2$ and between the electrodes $M'_1$ and $M'_2$ is maintained at zero.

The current lines 412 in the shallow investigation configuration are illustrated to the left of the tool 400, while the current lines 413 for the deep investigation configuration are illustrated to the right of the tool 400. The current lines 413 turn toward the borehole at a point far from the tool and return, for example, to a ground electrode located on the cable 410 supporting the tool 400. The currents 413 transmitted by the electrodes $A_1$, $A_2$, $A'_1$ and $A'_2$ are controlled so as to force the current transmitted by the electrode $A_O$ more or less far into the formation according to the desired investigation depth.

A bi-plate antenna 401 is mounted at one end of this set of electrodes, longitudinally below the electrode $A'_2$. It is connected to an oscillator operating at a frequency of 500 kHz to transmit to the formation a radiation of corresponding frequency. Two receiving bi-plate antennas 404 and 406 are mounted respectively between the electrodes $A'_1$ and $A'_2$ and the electrodes $A_1$ and $A_2$. The first elements of the antennas 401, 404 and 406 are of the type of the element 124 of FIG. 6, for example, and are placed on a sleeve such as 120 comprising ferromagnetic alumina material whose magnetic permeability is about 250. The antennas 401, 404 and 406 are connected to electronics used for the acquisition and processing of the signals picked up after propagation in the formation to furnish a differential conductivity measurement, as described. The combination of the measurements made by the receivers 404 and 406 makes it possible to obtain such a differential conductivity measurement which is corrected for the influence of the zone immediately in the vicinity of the tool, i.e. of the borehole proper and of the surface zone around the wall of the borehole.

The antennas 401, 404 and 406 have a common conducting ground plane at the frequency of 500 kHz. The current electrodes $A_O$, $A_1$, $A'_1$, $A_2$, $A'_2$ are all connected electrically at 500 kHz to this ground plane so that the ground plane is in electrical contact with the mud at different points over its length at the frequency of 500 kHz. The ground plane is established with suitable capacitive links between its different portions so that at the operating frequency of the current electrodes $A_O$, $A_1$, $A'_1$ $A_2$ and $A'_2$, which is a few hundred hertz, these electrodes are not connected electrically to one another by the ground plane.

Figure 17:
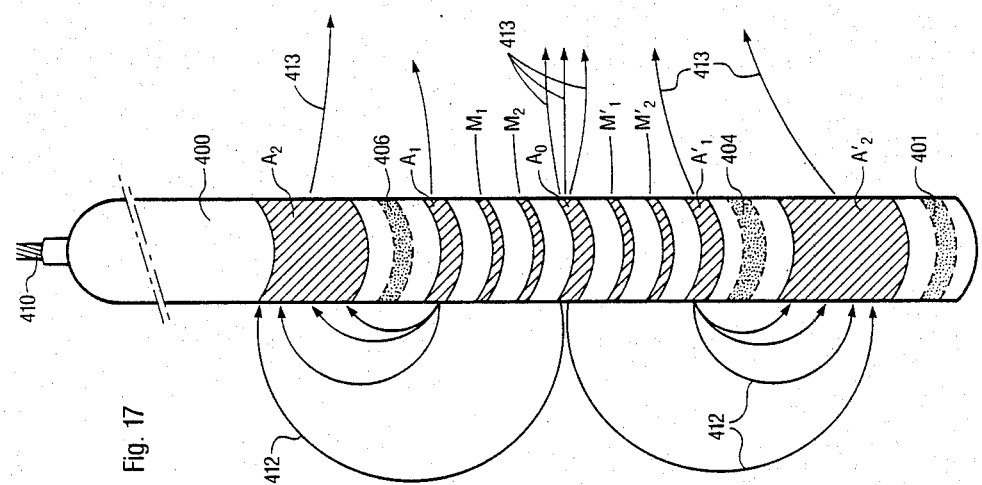
FIG. 17 is a pictoral diagram illustrating the transducer arrangement of a combination electrical-electromagnetic logging tool, in accordance with the present invention.

Such a tool can replace advantageously a tool such as described in the aforementioned Schneider Patent. The use of a bi-plate antennas obviates the need for electrodes having respectively small cross sectional area and allows the use of relatively massive electrodes having better investigation depth performance. In addition, the performance of the conductivity measuring apparatus with bi-plate antennas (as shown in FIG. 17) is improved in relation to coil antennas from the standpoint of better vertical resolution and smaller influence of the immediate environment of the borehole, due to the differential nature of the measurement and the higher signal levels.

Antennas for electromagnetic logging of the type described are also utilizable at frequencies higher than 200 MHz. At these higher frequencies the antennas preferably are mounted on pads and are separated by a longitudinal distance compatible with a relatively shallow investigation depth.

According to one embodiment, such antennas can be made in the form of buttons (FIG. 13) in which a button 300 of dielectric material is covered on one of its faces with a conducting metal layer 302 forming a ground plane and has a fine metal strip 306 printed on its opposite face 304 in spiral form between a central end 308 which can be connected electrically (short-circuited) with the ground plane 302, and another end 310. The end 310 is left unconnected if the length of the strip 306 is equal to one-fourth the propagation wavelength of the radiation in the dielectric 300 (or to an odd multiple thereof) and is short circuited with the ground plane 302, as in the example shown, if the length of the strip 306 is equal to half the propagation wavelength (or to a multiple thereof).

Figure 13:
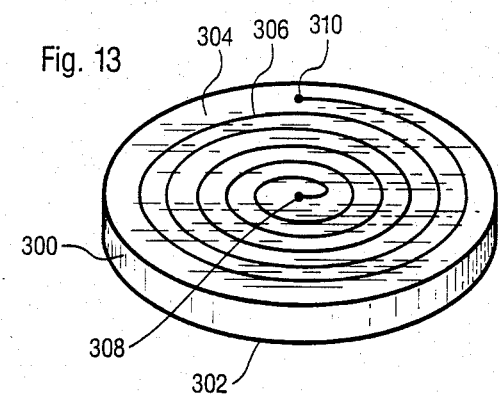
FIG. 13 is a perspective elevation of a button antenna for a pad-type electromagnetic logging tool, in accordance with the present invention.
Figure 15:
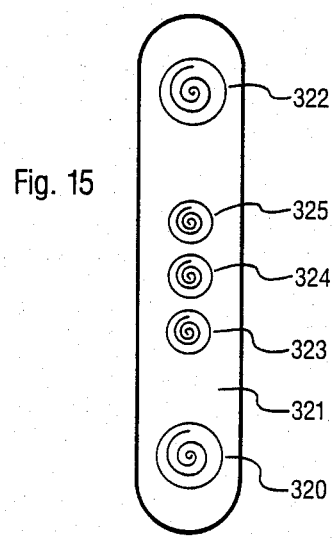
FIG. 15 is a side elevation of another embodiment of a pad for a pad-type electromagnetic logging tool having antennas of the type shown in FIG. 13, in accordance with the present invention.

Several buttons of the type shown in FIG. 13 can be integrated in an elongated pad 321 of the type shown in FIG. 15, mounted on a surface of the pad 321 which is applied against the wall of the borehole. Respective transmitting buttons 320 and 322 similar to the one represented in FIG. 13 are connected to a very high frequency power oscillator (not shown). Between the two transmitting buttons 320 and 322 in the vicinity of the central part of the applied surface of the pad 321, are mounted three receiving buttons, respectively 323, 324 and 325, aligned in the longitudinal direction of pad 321. Pads 321a and 321b (FIG. 1) identical to pad 321, are shown mounted in a known manner on the sonde mandrel 44 and hinged so that they can be applied by means of respective arms 43a and 43b against the wall 28 of the borehole, either under the action of a permanent elastic load exerted by springs in the form of an arc or by means of arms whose opening is remote-controlled. The tool of FIG. 1 equipped with pads 321a and 321b makes it possible to obtain, at each respective position, a conductivity measurement as well as a dielectric measurement. These measurements are recorded, thereby facilitating correlation and processing.

An arrangement with two transmitting antennas 320 and 322, as in FIG. 15, is used to compensate for the effects of a lack of uniform application of the pad against the wall of the borehole due to, for example, irregularities in the wall. Techniques to compensated for the influence of the borehole (known as BHC techniques) are well known for tools operating with other types of transducers, as described, for example, in U.S. Pat. No. 3,257,639 (issued June 21, 1966 to Kokesh), which hereby is incorporated herein by reference.

A pad 321 such as the one in FIG. 15 is suitable for operation in the frequency range from 60 MHz to 3 GHz (ultrahigh frequencies) and may be advantageously employed in a dipmeter tool. Measurements derived with buttons 323 to 325 make it possible to detect with high resolution variations in the dielectric characteristics of the formation strata traversed by the borehole. According to known dipmetering techniques, all the information coming from three, and preferably four, similar pads applied to the wall of the borehole, as described in U.S. Pat. No. 3,423,671 (issued Jan. 21, 1969 to Vezin), which hereby is incorporated herein by reference, permits a determination of the dip angles of the various subsurface earth strata. Bi-plate antennas of the type described above make it possible to adapt this tool advantageously to boreholes filled with non-salty water and petroleum-based drilling muds in which conventional electrode-based tools do not operate effectively.

Both aforementioned approaches provide extremely fine representations of such variations in geological characteristics as fractures and other discontinuities of formations traversed by the borehole.

Figure 16:
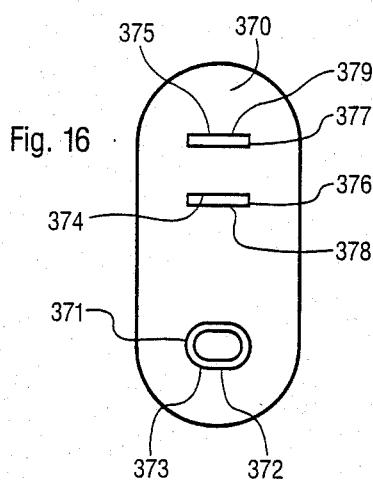
FIG. 16 is a side elevation of yet another embodiment of a pad for a pad-type electromagnetic logging tool having bi-plate antennas, in accordance with the present invention.

The present invention also pertains to the making of pads for transmitting and receiving electromagnetic energy at extremely high frequency. As shown in FIG. 16, a pad 370 is provided with a bi-plate type transmitting antenna 372, comprising preferably a metal ring 373 printed on a dielectric, forming the applied surface of the pad 370, connected electrically at a point 371 to a ground plane placed on the other side of the surface of the dielectric. The perimeter of antenna 372 is suitable for forming a half-wave antenna with a high operating frequency such as 850 MHz, for example. Receiving antennas 378 and 379 comprise respectively bars 374 and 375 aligned with antenna 372 at the surface of the pad 370 in a longitudinal direction. Bars 374 and 375 are connected electrically at one of their ends 376 and 377 to the ground plane located on the other side of the dielectric forming the surface of the pad 370. The length of bars 374 and 375 correspond to one-fourth the wavelength for the resonant frequency. Pad 370 allows the detection of certain parameters of the propagation of the electromagnetic energy transmitted by the transmitter 372 in the vicinity of the wall of the borehole, notably in the mudcake.

Figure 14:
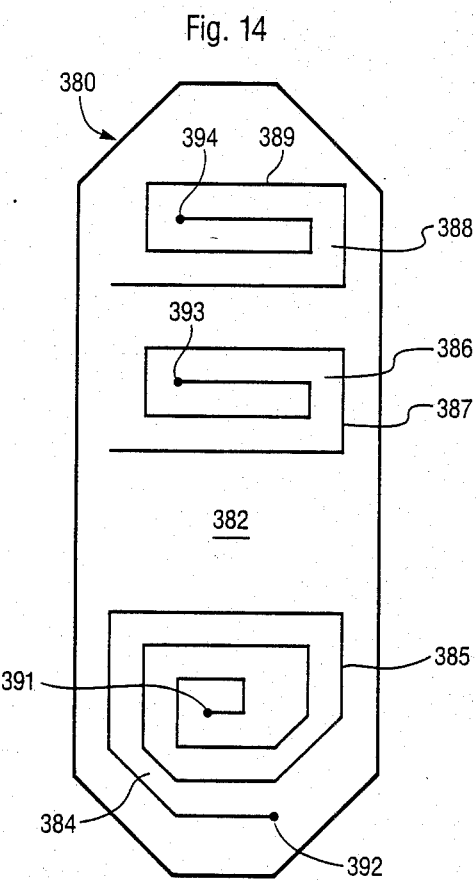
FIG. 14 is a side elevation of an embodiment of a pad for a pad-type electromagnetic logging tool having bi-plate antennas, in accordance with the present invention.

Antennas in accordance with the present invention also are suitable for investigations in the very high frequency (VHF) range, i.e. frequencies between 200 and 500 MHz. For this purpose, a pad 380 (FIG. 14) for shallow investigation (i.e., the so called "flushed zone" resistivity, or $R_{xo}$ measurement) comprises an insulating plate 380 in an abrasion-resistant material, such as a composite of glass fiber and resin. Plate 380 is elongated in a direction corresponding to the direction of longitudinal movement of the logging tool to which pad 380 may be connected (as described above) through a borehole. Pad 380 further comprises a lower transmitting antenna 384 and two receiving antennas 386 and 388, aligned longitudinally. The side of pad 380 farthest from the formation has a continuous metal coating establishing a ground plane embedded, in a sheath to provide protection against the borehole fluids in which the pad is immersed. Each of antennas 384, 386, and 388 comprises, in addition to the ground plane and the dielectric layer forming the thickness of the pad proper, a metal strip (respectively 385, 387 and 389), printed in the front surface 382 of pad 380 along a spiral line comprising straight-line segments joined at sharp angles, in order to cover a substantial portion of the pad. The antenna 384 occupies the lower part, the printed metal strip 385 of this antenna being short-circuited with the ground plane at its central end 391 and at its peripheral end 392. The length of antenna 384 is selected to form a half-wave antenna. The two receiving antennas 386 and 388 each have a central end, respectively 393 and 394, short-circuited with the ground plane on the back face of the pad. The respective other ends of the metal strips 387 and 389 of the antennas 386 and 388 are left free, the length of strips 387 and 389 being equal to one-fourth the wavelength of the selected radiation.

The pad 380 is of particular value in non-salty water and petroleum based muds where the electrode-type pads do not operate. Pad 380 has a lower sensitivity to the resistivity of the mud, the influence of which is eliminated by a differential measurement, and facilitates obtaining better knowledge of the resistivity of the formation water $R_w$. In fact, the measurement of the dielectric constant in the vicinity of the borehole wall makes it possible to know the water saturation $S_w$ in the zone called the invaded zone where, under the effect of the pressure of the borehole mud in contact with the wall, the filtrate of the mud has penetrated after having deposited the solid particles on the borehole wall to form the mudcake. Hydrocarbons which may be located in the pores of this formation are at least partially displaced.

The metal parts of the antennas on the pads represented in FIGS. 14 to 17 are advantageously coated with an insulating protective covering in order to better resist both mechanical abrasion and chemical corrosion.

While the invention has been described in accordance with the preferred embodiments as presently conceived, it is to be appreciated that the preferred embodiments are illustrative and that the invention is not intended to be limited to the preferred embodiments. Modifications of the present invention not described herein will become apparent to those of ordinary skill in the art after a perusal of this disclosure.

What is claimed is:

1. A mandrel apparatus for investigating a characteristic of a subsurface earth formation traversed by a borehole with propagatory electromagnetic energy, comprising:
    a signal source having a preselected frequency of operation;
    first magnetic dipole means coupled to said signal source, the frequency of operation of said signal source and the characteristics of said first magnetic dipole means being such as to provide for the transmission of propagatory electromagnetic energy into the earth formation;
    a receiver circuit;
    second magnetic dipole means coupled to said receiver circuit, the characteristics of said receiver circuit and said second magnetic dipole means being such as to provide for the detection of propagatory electromagnetic energy from the earth formation; and
    a longitudinally elongated structural conductive housing member, said first and second magnetic dipole means being mounted thereon at respective longitudinal locations with the respective axes of said first and second magnetic dipole means being parallel to the longitudinal axis of said conductive housing member, and said conductive housing member being essentially continuously conductive both longitudinally and circumferentially and having a longitudinal portion between the respective locations of said magnetic dipole means that is uninsulated from the borehole.

2. An apparatus as in claim 1, wherein said housing member comprises an elongated steel tube having at the respective locations of said first and second magnetic dipole means respective sections of reduced outer diameter, said first and second magnetic dipole means being securely affixed to said respective reduced diameter sections and recessed relative to full diameter sections of said tube.

3. An apparatus as in claim 2 further comprising:
    a plurality of longitudinal conductive bars integral with full diameter sections of said tube and circumferentially enclosing one of said first and second magnetic dipole means; and
    a plurality of longitudinal conductive bars integral with full diameter sections of said tube and circumferentially enclosing the other one of said first and second magnetic dipole means.

4. An apparatus as in claim 1 further comprising:
    a plurality of longitudinal conductive bars integral with said housing member and circumferentially enclosing one of said first and second magnetic dipole means; and
    a plurality of longitudinal conductive bars integral with said housing member and circumferentially enclosing the other one of said first and second magnetic dipole means.

5. An apparatus as in claim 1, wherein said housing member comprises an elongated steel tube, said first and second magnetic dipole means being securely affixed thereto, further comprising:
    an abrasion-resistant insulating coating encasing one of said first and second magnetic dipole means; and
    an abrasion-resistant insulating coating encasing the other one of said first and second magnetic dipole means.

6. An apparatus as in claim 1, wherein each of said first and second magnetic dipole means is a solenoid antenna having the magnetic dipole axis thereof coincident with the longitudinal axis of said housing member.

7. An apparatus as in claim 1, wherein each of said first and second magnetic dipole means is a cylindrical microstrip antenna having the magnetic dipole axis thereof coincident with the longitudinal axis of said housing member.

8. An apparatus for investigating a characteristic of a subsurface earth formation traversed by a borehole with propagatory electromagnetic energy, comprising:
    an electrically conductive longitudinally elongated structural housing member, said housing member being structurally integral both longitudinally and circumferentially;
    a signal source having a preselected frequency of operation;
    a transmitter antenna having essentially magnetic dipole characteristics coupled to said signal source;
    said transmitter antenna being mounted on said housing member at a first longitudinal location with the magnetic dipole axis thereof parallel to the longitudinal axis of said housing member, and being insulated from said housing member and from the borehole; and the frequency of operation of said signal source and the characteristics of said transmitter antenna being such as to provide for the transmission of propagatory electromagnetic energy;
    a first receiver circuit;
    a first receiver antenna having essentially magnetic dipole characteristics coupled to said first receiver circuit;
    said first receiver antenna being mounted on said housing member at a second longitudinal location with the magnetic dipole axis thereof parallel to the longitudinal axis of said housing member, and being insulated from said housing member and from the borehole; and the characteristics of said first receiver circuit and said first receiver antenna being such as to provide for the detection of propagatory electromagnetic energy;

a second receiver circuit; and a second receiver antenna having essentially magnetic dipole characteristics coupled to said first receiver circuit;

said second receiver antenna being mounted on said housing member at a third longitudinal location with the magnetic dipole axis thereof parallel to the longitudinal axis of said housing member, and being insulated from said housing member and from the borehole; and the characteristics of said second receiver circuit and said second receiver antenna being such as to provide for the detection of propagatory electromagnetic energy;

respective longitudinal sections of said housing member between said transmitter antenna and said first receiver antenna, and between said first and second receiver antennae, being uninsulated from the borehole.

9. An apparatus as in claim 8, wherein said housing member comprises a metal tube.

10. An apparatus as in claim 8, wherein each of said transmitter and receiver antennae is a solenoid antenna having the magnetic dipole axis thereof coincident with the longitudinal axis of said housing member.

11. An apparatus as in claim 8, wherein each of said transmitter and receiver antennae is a cylindrical microstrip antenna having the magnetic dipole axis thereof coincident with the longitudinal axis of said housing member.

* * * * *